Dec. 3, 1963 A. I. REITMAN 3,112,762
RECEPTACLE-OPERATED SUPPLY VALVE
Filed March 31, 1960
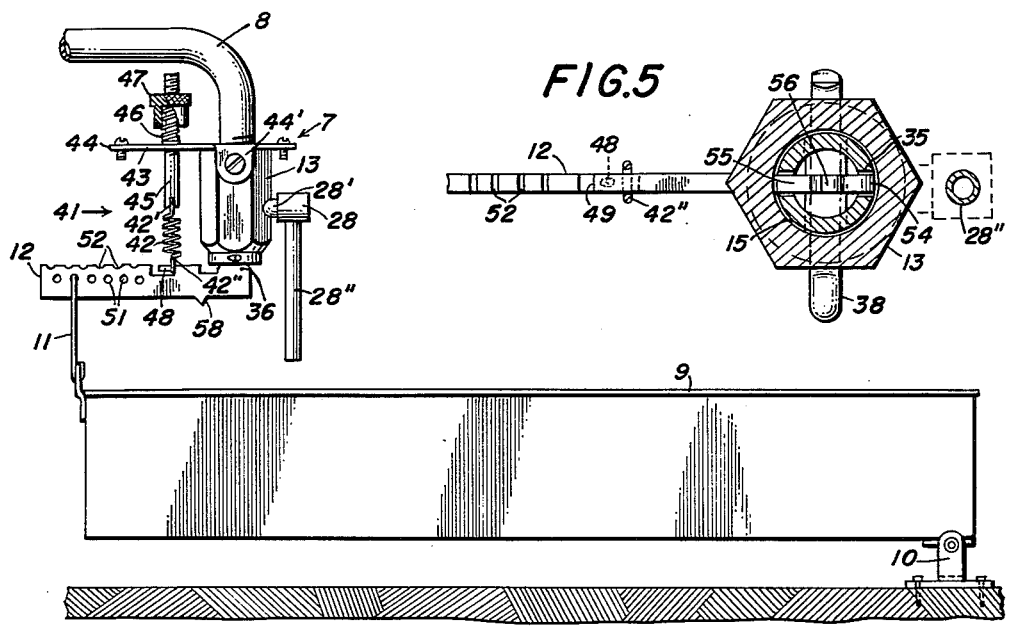
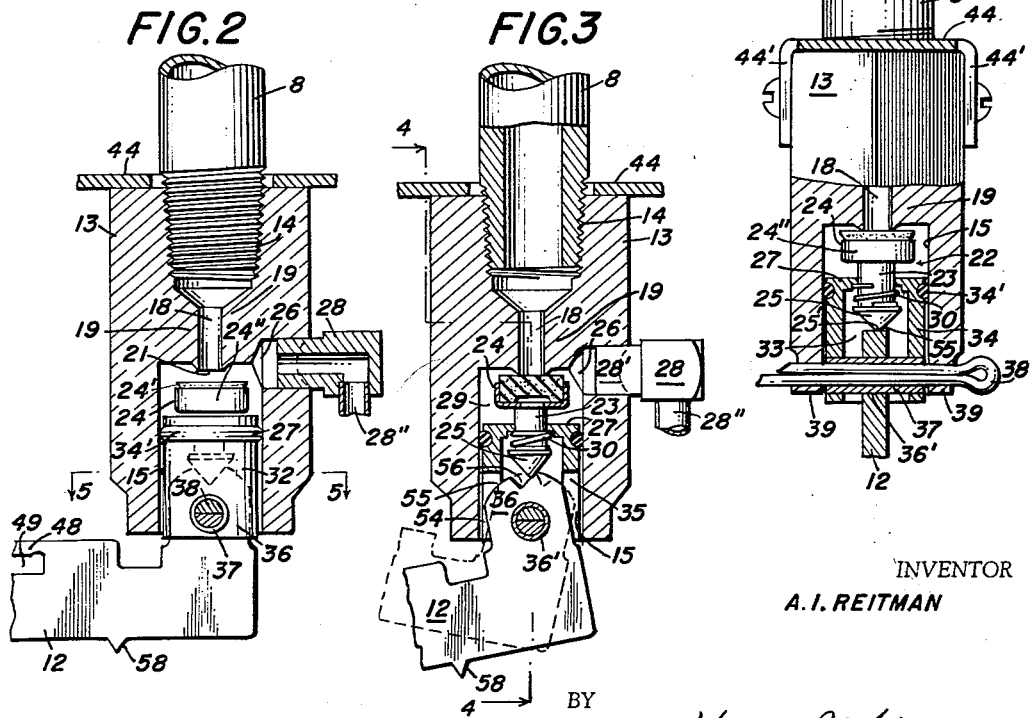
INVENTOR
A. I. REITMAN
BY Henry N. Young
ATTORNEY 3,112,762
RECEPTACLE-OPERATED SUPPLY VALVE
Abraham I. Reitman, 10407 Byron Ave.,
Oakland 3, Calif.
Filed Mar. 31, 1960, Ser. No. 18,973
1 Claim. (Cl. 137—408)

The invention relates to a liquid-supply valve which is primarily arranged for its control by a liquid-receiving receptacle in accordance with the weight of the receptacle and its liquid contents, and for maintaining a desired such weight for the assembly.

In particular connection with poultry and animal husbandry, it is most important that an adequate water supply be provided and automatically maintained in a watering trough or other open-topped basin-providing receptacle under control of the existing quantity of water therein, it being understood that a corresponding type of valve control is frequently useful and desirable in industry with respect to the maintenance of fixed quantities of liquid in various receivers. In accordance with the present invention, it is therefore a general object to provide a liquid-supply valve assembly of particularly simple and effective structure for meeting the aforesaid and other conditions.

A more specific object is to provide a liquid-supply valve providing the present type of control with an improved double-action means for automatically maintaining a desired liquid level in a supplied receptacle.

Another object is to provide a valve of the present type usch that it is arranged for its operative installation in cooperative combination with receptacles of different weights and dimensions.

A further object is to provide a valve of the character described having a valve plug assembly arranged for a ready removal thereof from the valve body for cleaning or replacement without interfering with the relation of the valve body to a liquid-receiving receptacle with which the valve is associated.

An added object is to facilitate a fixed mounting of the valve in cooperative relation to an installed receptacle, or vice versa.

The invention possesses other objects and features of advantage, some of which, with the foregoing, will be set forth or be apparent in the following description of a typical embodiment thereof, and in the accompanying drawings, in which, FIGURE 1 is an elevation showing the present valve as cooperatively associated with a watering trough or the like.

FIGURE 2 is an enlarged fragmentary sectional elevation taken in an upright plane through the axis of the valve body, with the cooperative valve parts shown as in opened-valve relation.

FIGURE 3 is a view corresponding to that of FIGURE 2 and showing the valve in closed condition.

FIGURE 4 is a partial section of the valve taken at the broken line 4—4 in FIGURE 3.

FIGURE 5 is a section taken at the line 5—5 in FIGURE 2.

As particularly illustrated, a unitary valve assembly 7 including the features of present invention is operatively installed between a fixedly mounted terminal portion of a liquid-supply pipe 8 and an open-topped liquid receptacle comprising a trough 9 which is normally supported in part from the valve in such a manner that the weight of the trough and any liquid therein controls the condition of the valve as a flow control means. As particularly illustrated, an open-topped receptacle comprising the trough 9 is hingedly supported at one end on a fixedly positioned bracket base 10 for its swinging adjustment in a vertical plane, and has its other end supported by a link 11 depending from a flow-controlling arm 12 of the valve assembly. Essentially, the arm 12 has one end thereof hingedly carried by the valve body for a swinging of the arm in an upright plane, is engaged by the link 11 at a point spaced from its axis of hinging, and is suitably spring-biased toward an upwardly swung position thereof.

The mechanism of the present valve 7 is provided in or on a generally cylindrical tubular body 13 having its axis upright and providing relatively large aligned upper and lower bore portions 14 and 15 respectively defining coaxial cavities extending from the opposite body ends and connected by a relatively smaller bore or port 18 extending axially through an integral body portion 19 which comprises a partition between the larger bore portions, with the bore 18 providing a valved flow duct between the cavities of the bores 14 and 15. As shown, the bore 14 is threaded for its supported connection to the depending end of the supply pipe 8 for fixedly supporting the valve body from the appropriately supported pipe, and the bottom of the bore cavity is downwardly and conically tapered to its juncture with the upper end of the duct 18 for providing a funneled flow of liquid from the pipe 8 through the opened port 18.

The under side of the body partition 19 provides an annular valve seat 21 with respect to which a unitary valve-plug assembly 22 is operative, with said assembly essentially including a cylindrical stem section 23 of uniform diameter connecting an end portion 24 comprising a relatively soft discate sealing washer 24' for sealing engagement with the seat 21 and replacedly mounted in a cylindrical cup member 24" which is loosely and coaxially swiveled to the stem end thereat, and a conical end portion 25 tapering coaxially outwardly from the other stem end to a preferably rounded apical point 25' thereof. The outside diameters of the portions 24 and 25 both exceed that of the connecting stem portion 23 of the assembly, and the stem and point portions 23 and 25 of the assembly 22 preferably comprise parts of a homogeneous body of liquid-impervious material which is slightly and resiliently deformable as, for instance, a relatively hard but flexible nylon composition such as "Nylatron." Essentially, the present valve plug assembly 22 is arranged for its required flexed deformation to provide and maintain a fully sealed engagement of the washer 24' with the seat 21 while the valve 7 is closed under control of the arm 12.

In the present arrangement, the side of the valve body 7 is provided with a radial discharge opening 26 to provide for the flow of liquid from the portion of the cavity 17 between the partition 19 and a fixedly disposed underlying member 27 partitioning the cavity 17 and carrying the valve-plug assembly. In the present assembly, the axis of the opening 26 lies substantially in the plane of the lower face of the body partition 19, and said opening fixedly and sealedly receives an arm 28' of a suitable angle fitting 28 having its other arm 28" depending from the elbow portion of the fitting and of appropriate length and form for a directed free gravity discharge of the liquid therefrom into a receiving receptacle, as the trough 9.

Preferably, and as shown, the valve stem 23 is slidably and guidedly engaged through an axial bore through the member 27 which is mounted in and across the uniform bore 15 of the body cavity 17 in such fixed spaced relation to the valve seat 21 that it defines between it and the body partition 19 a chamber 29 in which the valve plug assembly 22 is displaceable from the normally sealed engagement of its sealing disc 24 with the seat 21 for a full opening of the duct 18 to provide for the escape of the liquid through the discharge fitting 28. A helical compression spring 30 is operatively engaged between the annular inner face of the conical valve plug portion 25 and the opposed face of the disc 27 to constantly bias the valve plug 22 to its open-valve position of FIGURE 2 from which it is movable to its closed-valve position by the action of the control arm 12 against the combined actions of the liquid-supply pressure and the spring 30.

It will now be noted that the member 27 comprises the discate inner end of a generally cup-shaped unitary element 32 sealedly engaged in the present smooth and uniform bore 15 and opening downwardly and having the valve portion 26 and the spring 28 disposed in the upper portion of its downwardly-opening cavity 33. As shown, the member 32 has its tubular side wall 34 extending substantially to the bottom of the bore 15 as a positioning skirt portion of the member which is sealedly and removably engaged with said bore in a suitable manner, as by means of a neoprene ring 34' engaged in a peripheral groove provided in the member side 34 adjacent its disc portion 27 as comprising the liquid seal for the member and portion. Mutually coplanar kerfs or slots 35 of like width extend from the bottom end of the member 32 through the side 34 thereof in a plane axial and diametric of the member to jointly and guidedly receive parts of a valve-seating cam portion 36 of the control arm 12 which extends as a lateral ear from the upper edge line of the arm 12 adjacent an end thereof.

As shown, the ear 36 rotatably receives in a transverse bore 36' therethrough an intermediate portion of a tubular sleeve member 37 which is disposed in a diametric bore through the bottom end portion of the member 32 within the confines thereof and in press-fit relation to the bore. The sleeve member 37 encloses a close-fitting pin 38 which has the opposite end portions thereof directly engaged through aligned radial openings 39 provided in and adjacent the bottom of the valve body 13, whereby the pin 38 functions to releasably secure the member 32 within the bore 15. The pin 38 may conveniently comprise a cotter key to facilitate an assembly and disassembly of the member 32 and the attached valve plug assembly with respect to the valve body 13, the arrangement being essentially such that the pin 38 fixes the member 32 within the bore 15 while the engagement of the member 32 through the arm ear 36 provides for a limited swinging of the lever arm 12 about the member 37.

The present valve-control arm 12 comprises an elongated flat bar of uniform thickness which is arranged for its swinging in its plane about the axis of the body-carried sleeve member 37 which is engaged through the terminal arm ear 36 providing for the present hinged attachment of the arm to the valve body for its desirable swinging between limiting valve-closing positions thereof (FIGURES 3 and 4) through an intermediate position (FIGURES 1 and 2) in which the valve 7 is permitted to fully open through the action of the biasing spring 30 of the valve plug assembly 22. Accordingly, the valve-attached arm 12 is arranged for the swingable and resiliently yielding support of the end of the receptacle 9 through the support hub 11 therefor by a means 41 which is operative in tension at an intermediate arm point between the support points provided through the arm ear 36 and the receptacle-support link 11.

As particularly illustrated, the intermediate arm support means 41 includes a helical tension spring 42 connecting the valve-control arm 12 with a support arm 43 extending as a bracket in fixed overlying relation to the arm 12 from an element 44 which is mounted upon the upper end of the valve body 13 with its part 43 preferably directed from the opposite body side than that at which the angle fitting 28 is provided. The mounted element 44 has a flat portion providing the arm 43 and disposed opposite the upper body end and provided with downturned ears 44' at opposite sides thereof complementarily and closely receiving the upper portion of the body 13 between them and suitably fixed to the body as by tap screws. If desired, the flat portion of the element 44 may mount clamp screws for use in mounting the present valve assembly 7 directly on a suitable support (not shown) instead of depending on an independent fixed mounting of the pipe 8 for supporting the assembly.

In the present structure, the support arm 43 slidably and rockably receives therethrough a rod member 45 which extends through a relatively weak and normally expanded helical compression spring 46 and threadedly mounts above the spring a nut 47 which is cupped from below to receive the fully compressed spring 46 for the support of the rod from the arm by said spring and nut, or by the nut alone, for a slight lowering and swinging thereof during a use of the present valve assembly. At its lower end, the rod 45 is provided with a transverse eye opening for the attaching engagement therethrough of the upper hook end 42' of a tension spring 42 having its other end 42" formed as a hook or loop to engage the control arm 12, whereby the assembly of the present support means 41 comprises the spring 42 and the rod 45 and the spring 46 and the nut 47. As particularly shown, the lower tension spring hook 42" is engaged with and beneath an underlying tongue 48 which defines the upper side of an L-shaped notch 49 extending into the control arm 12 from its upper edge.

A means is preferably provided for attaching the upper end of the receptacle-supporting link 11 to the control arm 12 selectively at spaced points along the arm portion which extends beyond the support means 41, and said arm portion is particularly shown as being provided therealong with a line of holes 51 therethrough and a line of cross-notches 52 in its top edge, with said holes and notches being arranged for their selective hook-on engagement by a laterally-directed top portion of the link. It will be understood that the aforesaid provision for adjustably connecting the link 11 to the control arm 12 provides for various adjustment of the relation of the present valve assembly 7 to receptacles 9 of different structural weights and/or lengths and/or normal loaded weights for meeting different installation conditions which generally provide for a substantially horizontal disposition of the arm 12 while the valve is open, as in FIGURES 1 and 2. It will also be understood that the link 11 may extend from a connection with a load-actuated receptacle-carrying member rather than from the receptacle itself for utilizing the present flow-control device.

Referring now to the specific form and functioning of the ear 36 of the control arm 12 with respect to the valve plug assembly 22, it will be noted that the present said ear has a uniform thickness for the guided extension of side portions thereof into the kerfs 35 of the member 32 which carries the valve plug assembly 22, has opposite side edge portions 54 mutually parallel and perpendicular to the plane of the arm and mutually spaced to permit the required swinging of the ear within the lower portion of the body cavity 17, and has the outer ends of its side edges 54 connected by an intermediately interrupted cylindrically curved camming edge portion 55 having the axis of its cylinder coincident with that of the transverse ear bore 36' which receives the sleeve member 37 on which the arm 12 is pivotally mounted.

It will now be particularly noted that the arcuate ear edge portion 55 is provided intermediately therewith with a V-notch 56 extending inwardly from said edge in symmetrical relation to a radial plane through the notch apex and the axis of the sleeve-receiving ear bore 36' whereby its mutually opposed side faces define camming edge portions and make equal angles with said plane and mutually define an included angle which is no less than that of the conical end portion 25 of the valve plug assembly, whereby the notch 56 may fully receive and engage said point while the valve-control arm 12 is substantially horizontally disposed in an intermediate position therefor and the valve is fully open, the latter relations being indicated in FIGURE 2. When the plug end 25 is fully seated in the notch 56, the sealing disc 24 of the plug assembly 22 is preferably held slightly spaced from the guide-disc end 27 of the member 32, it being understood that a rocking of the arm 12 in its plane from its intermediate open-valve position will actuate the appropriate notch face against the rounded tip portion of the point 25 as a double-acting cam of the arm for moving the valve plug unit with a minimum of friction against the seat 21 for its fully sealed and maintained engagement therewith while said point rides on the appropriate unnotched portion of the camming edge 55 of the ear, as in FIGURE 3.

Understanding that the chamber portion 29 will contain some of the liquid above the discharge passage provided by the part 28' of the fitting 28 while the present valve is either opened or closed, and that such trapped liquid may, at least in part, escape through the guide opening for the valve plug stem 23 in the part 27 of the element 32 for its downward flow upon the immediately overlying portion of the control arm 12, and thence downwardly to and along the bottom edge of said arm when said edge slopes downwardly, as in FIGURE 3, a means is preferably provided for insuring the discharge of any such escaping liquid into an open portion of the receptacle which underlies the present valve unit. As particularly shown, a drip-off projection 58 is preferably provided on and in depending relation to the bottom edge of the arm 12 and beneath the valve body 13 to prevent the delivery of any liquid escaping from the chamber 29 along the valve stem 23 elsewhere than into the receptacle, whereby to avoid waste of the liquid and the wetting of surfaces external to the liquid-receiving space of the receptacle. It will be understood that, by reason of the fact that the valve stem 23 and the member 27 are of dissimilar and relatively hard materials, that the valve stem will be subjected to a minimum degree of wear by reason of its reciprocation in the guide bore of said member.

Since the present valve-controlling watering troughs or receptacles, and particularly those which are used for supplying drinking water to poultry and smaller animals, are usually of rather light construction and may be accidentally disconnected from their linked connection with the control arm of the present type of valve, and are also arranged for their ready dismounting from the valve for their cleaning or replacement, it will be understood that the tension spring 42 is fully operative to dispose the control arm 12 in its upwardly swung position for the closing of the valve passage while a trough is disassociated with the valve. The effective strength of the compression spring 46 of the arm support assembly 41, which is operative between the bracket arm 43 and the nut 47 on the support rod 45, is preferably slightly less than that of the receptacle, or receptacle portion, to be supported, whereby an empty receptacle carried or remounted on the arm may compress the spring 46 for the engagement of the appropriately adjusted nut 47 with the bracket arm to thereby allow a sufficient downward swinging of the arm to open the valve for supplying the initially empty trough with water until the arm is disposed for the closing of the valve when the liquid in the receptacle has reached its desired level. It will thus be understood that the provision and action of the compression spring 46 eliminates any need for a "hand-lifting" of the control arm 12 to start a supplying of liquid to the initially empty arm-supported receptacle, since the action of said spring alone insures an opening of the present valve for providing a normal weight of liquid in the receptacle, and the subsequent maintenance thereof in the described manner.

From the foregoing description taken in connection with the accompanying drawings, the advantages of the present receptacle-operated supply valve will be readily understood by those skilled in the art to which the invention appertains. While I have shown and described a structure and operative arrangement which I now consider to comprise a preferred embodiment of my invention, I desire to have it understood that the showings are primarily illustrative, and that such changes and developments may be made, when desired, as fall within the scope of the following claim.

I claim:

In combination with a receptacle supported for its automatic lowering or raising in accordance with an increase or decrease respectively in the level of liquid in the receptacle, a fixedly mounted tubular valve body having its axis upright and providing a flow passage extending from its top for connecting said valve assembly at its inlet end to a supply of liquid under pressure and arranged for the discharge of the liquid therefrom into the receptacle for maintaining a predetermined liquid level in and with respect to the receptacle, means at the discharge end of said passage providing a valve seat arranged for its engagement by a reciprocable valve plug to sealedly close the passage thereat against the discharge pressure of the supplied liquid, a valve plug movable axially in said passage with respect to said seat, a means cooperative with said body and constantly biasing said valve plug to an unseated relation thereof with respect to said seat, a control member comprising a lever pivotally carried by said valve body for movement in an upright plane about an axis intersecting and perpendicular to that of the valve plug and with reference to a generally horizontal intermediate position thereof in which the valve is open and providing a cam means constantly and directly engaged by said vlave plug in the axial line thereof and comprising an edge cam having its working edge comprising circumferentially spaced edge portions of like radius coaxial with the pivotal axis of the lever and connected by a V notch directed toward said axis whereby a passage-closing disposal of the cam-engaging valve plug is effected by said cam edge when said lever is pivoted either above or below said generally horizontal intermediate position.

References Cited in the file of this patent

UNITED STATES PATENTS

| | | |
|---|---|---|
| 1,653,525 | White | Dec. 20, 1927 |
| 2,061,166 | Myers | June 17, 1952 |
| 2,620,829 | Tolley | Dec. 9, 1952 |
| 2,629,581 | Toadvine | Feb. 24, 1953 |
| 2,739,609 | Morris | Mar. 27, 1956 |
| 2,800,917 | Hoffmeister | July 30, 1957 |
| 2,894,717 | Camp | July 14, 1959 |